United States Patent [19]

Frase et al.

[11] Patent Number: 4,758,119
[45] Date of Patent: Jul. 19, 1988

[54] SEED HOPPER CONSTRUCTION WITH CENTRIFUGAL BLOWER-FILLER

[75] Inventors: Roland J. Frase, Roselle; George H. Wiemers, Greenview, both of Ill.

[73] Assignee: J. I. Case Company, Racine, Wis.

[21] Appl. No.: 929,614

[22] Filed: Nov. 12, 1986

[51] Int. Cl.⁴ .............................................. B65G 53/50
[52] U.S. Cl. ..................................... 406/109; 141/67; 221/278
[58] Field of Search ................ 221/211, 278; 406/109; 141/67; 222/630

[56] References Cited

U.S. PATENT DOCUMENTS

| | | | |
|---|---|---|---|
| 3,372,958 | 3/1968 | Black | 406/109 X |
| 3,779,428 | 12/1973 | Bauman | 222/498 |
| 3,860,146 | 1/1975 | Bauman et al. | 221/211 |
| 3,861,830 | 1/1975 | Johnson | 406/109 X |
| 3,885,704 | 5/1975 | Lienemann | 221/211 |
| 4,168,864 | 9/1979 | Weeks | 406/109 X |

FOREIGN PATENT DOCUMENTS 843810 1/1977 U.S.S.R. .

Primary Examiner—F. J. Bartuska
Attorney, Agent, or Firm—Dressler, Goldsmith, Shore, Sutker & Milnamow, Ltd.

[57] ABSTRACT

A seed hopper construction for use in connection with rotary drum seed planter requiring positive pressure for its seed metering operation. The hopper comprises a tapering bottom wall with an opening therein and an internal duct associated with said wall and opening. A deformable tubular diaphragm valve is positioned in the duct and projects from the opening in the bottom wall. A vertical air pressure tube is mounted in the hopper and carries a two-position valve for directing air into the hopper or to the diaphragm valve. The pressure tube also has a bottom air inlet depending from the bottom wall. A centrifugal blower having a positive pressure side outlet communicates with the pressure tube air inlet and the seed drum. The blower has a negative pressure central opening in spaced registry with the diaphragm valve. With the two position valve in one position, equalized positive pressure is maintained in the drum and container for planting; with the valve in the second position, the diaphragm valve rolls a bell-shaped member into seating engagement with the negative pressure opening of the blower to create a negative pressure in the hopper for refilling seeds thereinto.

15 Claims, 3 Drawing Sheets

SEED HOPPER CONSTRUCTION WITH CENTRIFUGAL BLOWER-FILLER

TECHNICAL FIELD

This invention relates to agricultural drum-type seed planters and, more particularly, to a seed hopper for such planters having a single blower and self-contained means for selective use of the blower in both seed planting and hopper filling modes.

BACKGROUND OF THE INVENTION

In drum-type seed planters, seed is typically gravity-fed from a hopper to a revolving seed drum. A fan or blower provides air pressure which pressurizes the interior of the drum, and which also pressurizes the interior of the hopper to permit gravity-flow of seeds into the pressurized drum. The air pressure within the drum causes seeds to be picked up in perforated pockets formed in the periphery of the drum as the same rotates. The pocketed seeds are released as they pass by external seed-release wheels which block the perforations of the pockets and the passage of air therethrough. The seeds thereupon drop into delivery tubes positioned within the drum and are propelled by the pressurized air to be delivered into opened furrows. Examples of rotating drum seed planters are shown in U.S. Pat. Nos. 3,848,552, 3,860,146, and 3,885,704.

As shown in the said patents, the pressurization means of prior planters typically comprised a rotary blade fan or centrifugal blower mounted on the rear of the seed hopper and in communication with the planter drum. The fan was vertically oriented and various tubes and ducts were provided between the drum and hopper for achieving the desired equalized pressure in the hopper and drum. While that arrangement has been very commercially successful, it did not facilitate replenishment of the seed supply hopper. Specifically, when refilling of the seed hopper was required, it was necessary for the operator to remove the hopper cover and manually pour in seeds, or else attach some form of screw conveyor or the like connected to a bulk source of seeds.

More recently, efforts have been made to refill a seed hopper from a bulk source by creating a negative pressure or suction condition in the hopper. In general, those efforts involved complex and expensive tubing and valve arrangements attached to and external of the hopper. One example of such an arrangement is illustrated in USSR Patent No. 843,810, which shows a fan which can be connected to a seed bunker through a fan intake pipe which can be alternately opened to the atmosphere and the interior of the bunker. In that arrangement, however, the fan operates externally on pneumatic seed ducts positioned under the bunker, and thus the device is unsuitable for drum-type seed planters which require positive air pressure within the seed hopper for proper functioning.

There thus exists a need for a drum-type seed planter construction having simplified pressurization means operable for planting and for filling the seed supply hopper.

SUMMARY OF THE INVENTION

The present invention provides an improved seed hopper filling arrangement for drum planters which facilitates convenient and efficient replenishment of the seed supply. The invention is compact and of simple construction, requiring no external tubing or ducting, and yet is selectively operable to create the necessary positive or negative pressure in the hopper. Essentially, the arrangement permits the intake of the planter blower to be operatively connected with the interior of the seed hopper, whereby the negative pressure created therein permits suction-filling of the hopper with seed.

Briefly, the invention comprises a compact hopper having a tapering bottom wall and a seed tube communicating with a seed drum which is attached to the front wall of the hopper. A substantially vertical pressure supply tube is positioned in the hopper, with the bottom end thereof comprising an air intake fitting projecting below the tapered bottom wall. The top of the pressure supply tube is positioned near the top of the hopper and the same comprises a two-position valve selectively permitting air to flow into the hopper or through a fitting and air hose connected thereto.

The opposite end of the air hose is connected to an annular housing which comprises a part of the hopper frame and which depends from the tapered bottom wall thereof. The annular housing carries and is closed by a flexible diaphragm to provide an annular sealed chamber. A movable bell-shaped air inlet valve member is carried by the diaphragm, with the valve member connected to and retained in an upward position generally within an internal duct adjacent the tapered bottom wall of the hopper.

A centrifugal blower is connected to the hopper bottom wall so that the output end of its scroll communicates with the pressure supply tube to the hopper and the interior of the seed drum. At the same time, the negative pressure center of the blower is in alignment with, but in the planting mode spaced from, the air inlet valve member. The blower itself is self-contained in its own chamber which includes air intake vents and optional oil cooler means.

During operation in the planting mode, pressurized air from the blower passes through the pressure supply tube and into the hopper to equalize the pressure between the hopper and rotary seed drum as the blower provides the required positive pressure for operation of the drum. As noted, the air inlet valve member is spaced from and out of contact with the negative pressure center of the blower during planting.

In order to refill the hopper with seeds, the two-position valve at the top of the pressure supply tube is rotated to divert the pressurized air from the blower through the hose and into the annular housing positioned generally about the movable inlet bell. This pressurized air from the blower now causes the diaphragm to "roll" and move the air inlet valve member downwardly until it comes into contact with and seals against the blower center. The negative pressure from the blower center now acts through the internal duct to create a negative pressure in the hopper so that seed may be drawn thereinto from a bulk source.

Other features of the invention include a novel top cover for the hopper having inlet means for connection to a supply hose or the like coming from the bulk seed source. The top cover functions in the nature of a one-way flow check valve, and comprises spring-urged deflector means which evenly distributes the incoming seeds and retards their speed to reduce seed cracking and destruction.

Numerous other advantages and features of the present invention will become readily apparent from the following detailed description of the invention, from the claims, and from the accompanying drawings.

BRIEF DESCRIPTION OF THE DRAWINGS

In the accompanying drawings forming a part of the specification, and in which like numerals are employed to designate like parts throughout.

DETAILED DESCRIPTION OF THE INVENTION

Figure 1:
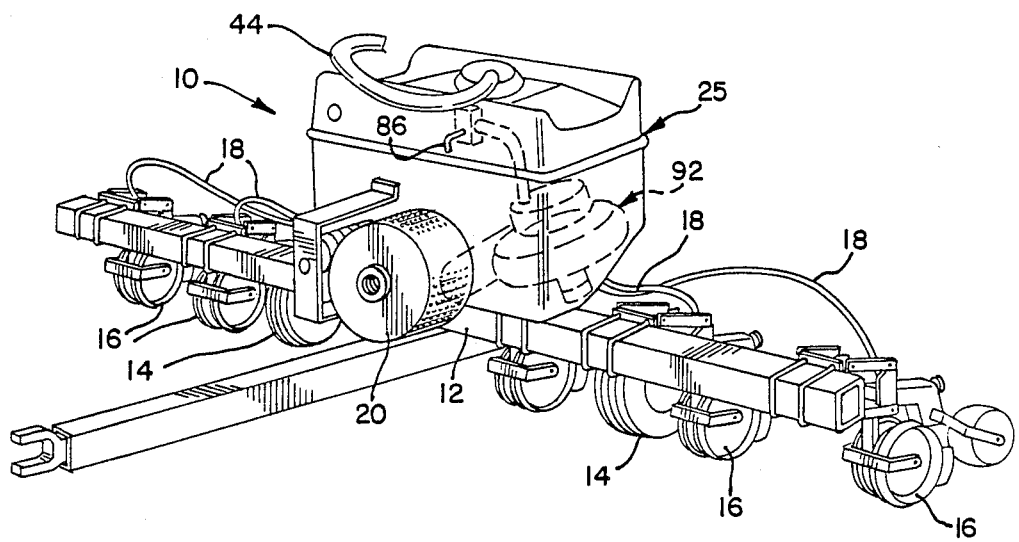
FIG. 1 is a front perspective view of a drum-type seed planter implement incorporating a hopper filling arrangement embodying the principles of the invention.

While the present invention is susceptible of embodiment in various forms, there is shown in the drawings and will hereinafter be described a presently preferred embodiment, with the understanding that the present disclosure is to be considered an exemplification of the invention without limit to the specific embodiment illustrated.

Referring with particularity to the drawings, it will be seen that the reference numeral 10 indicates generally a seed planter implement of the type with which the invention is concerned. The implement 10 comprises a generally transverse frame 12 carrying support wheels 14. Furrow openers 16 are likewise mounted on the frame 12 and a seed supply tube 18 is associated with each furrow opener for delivering seed thereto from a metering seed drum 20. Operation of the seed drum 20 and the structural elements of the implement 10 thus far described are generally conventional, such as shown in U.S. Pat. No. 3,885,704. Seed drum 20 is rotatably mounted on a plate 22 (FIG. 2) which is secured to a seed hopper 25 suitably mounted on the implement frame 12.

The seed hopper 25 comprises a container housing having tapering bottom walls 26, 28, and 30 which slope downwardly to facilitate the gravity feed of seeds through a bottom opening 32 formed at substantially the low point of the hopper. A seed tube 34 communicates between the hopper 25 and the interior of the seed drum 20 through an opening formed in the plate 22. Seed tube 34 is also provided with a flapper valve 36 (see FIG. 2) which may be spring-urged for purposes which will subsequently become apparent.

Figure 3:
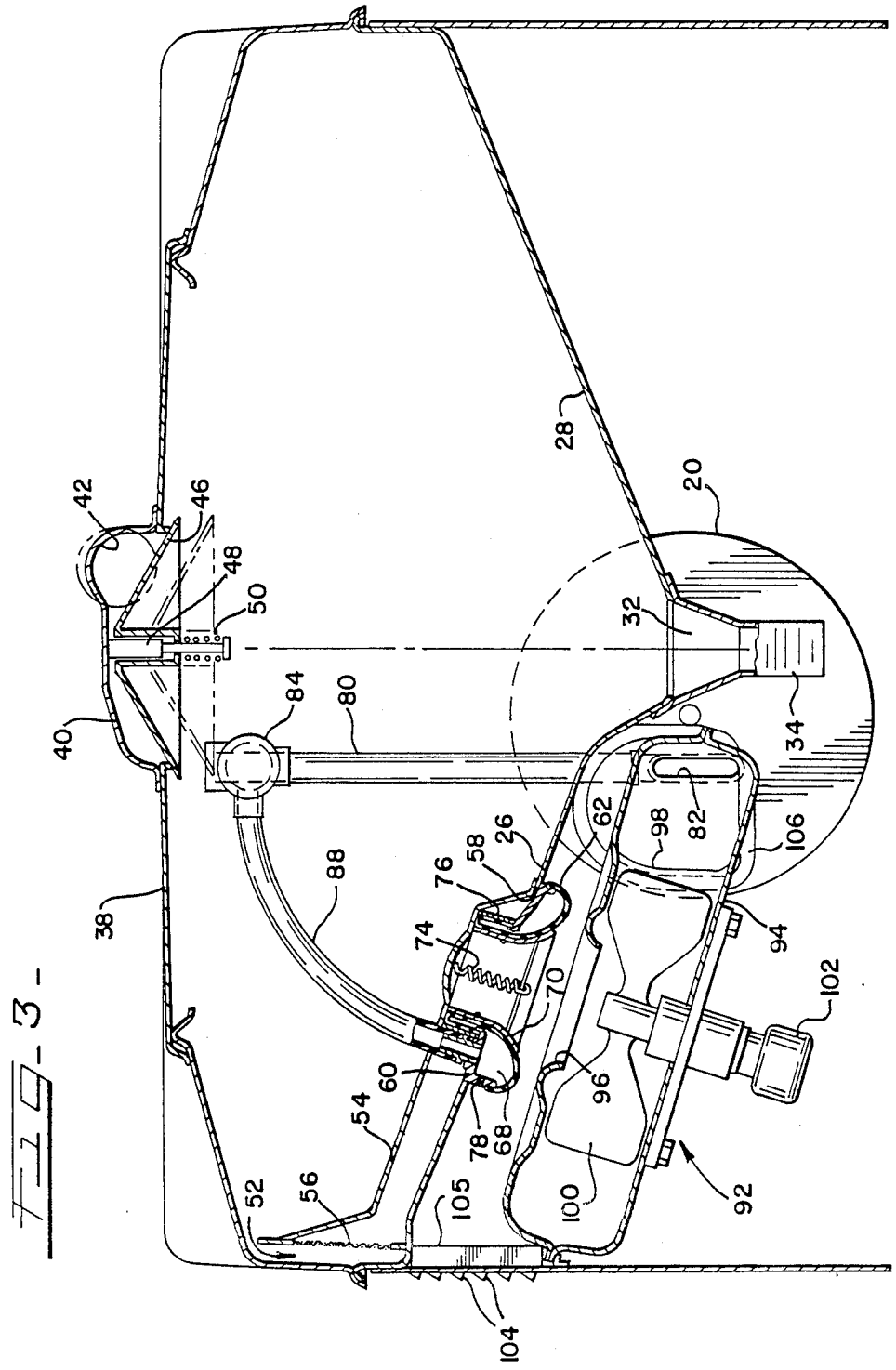
FIG. 3 is a fragmentary sectional view on the plane of line 3—3 in FIG. 2 illustrating the relationship of the components of the present invention during planting operation.

The top of seed hopper 25 is closed by a top lid 38 which may be hingedly attached or otherwise suitably mounted for permitting access to the hopper. Top lid 38 comprises further a central cap member 40 having an inlet port 42 whereby the hopper may be connected to a bulk seed source with a flexible tube such as 44. A conical valve member 46 is mounted to a post 48 depending from the cap member 40, and spring means 50 is provided for normally urging said valve member upwardly into sealing engagement with the cap member as illustrated in FIG. 3 of the drawings.

Figure 4:
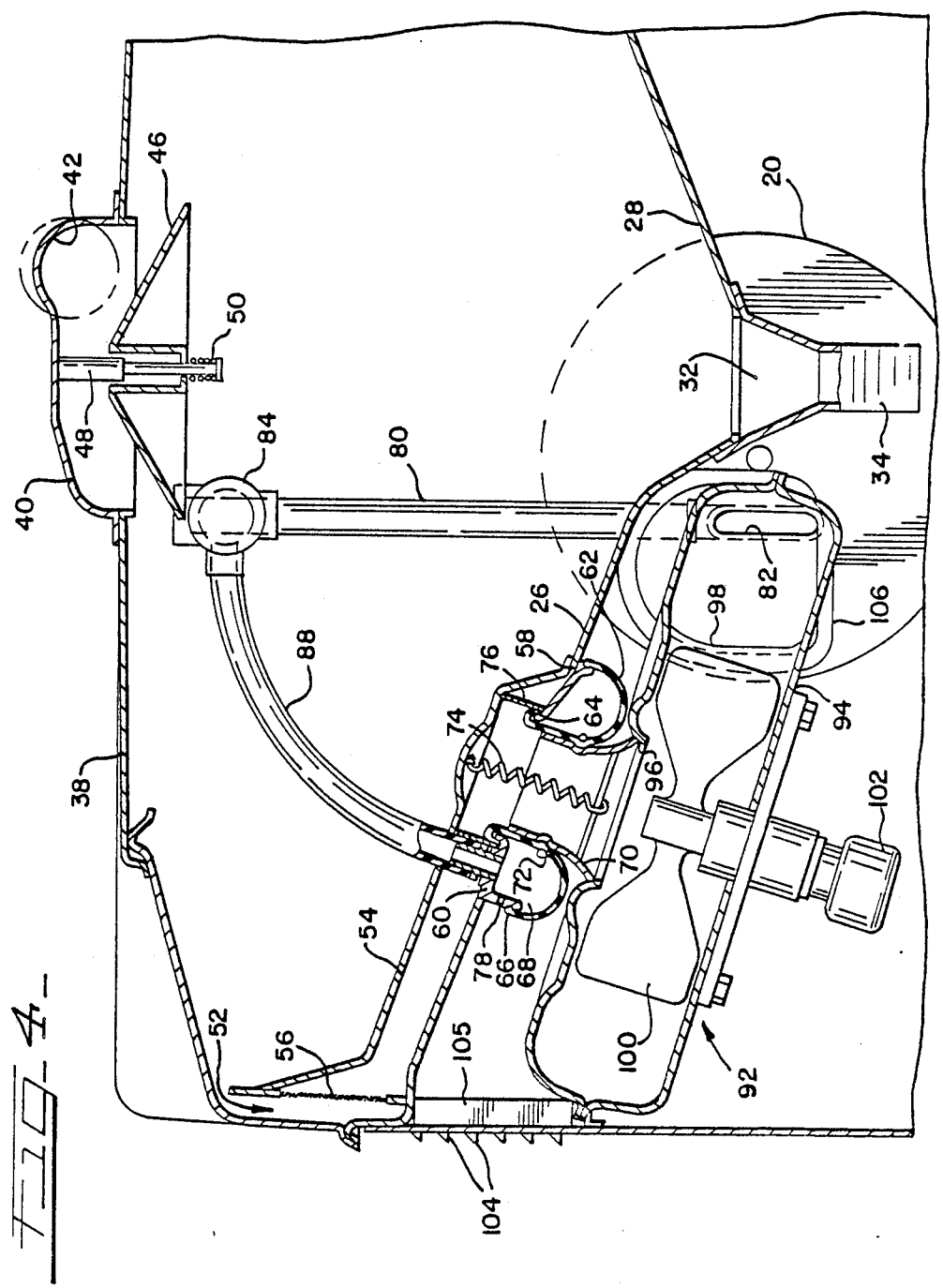
FIG. 4 is a partial view similar to FIG. 3 showing the relationship of components during seed refilling operation.

An internal duct 52 extends generally atop hopper bottom wall 26, said duct being formed by any suitable means such as a sheet metal member 54 and screened inlet 56 secured to, and cooperating with, said bottom wall to provide said duct. As seen in FIGS. 3 and 4, the bottom wall 26 is provided with a circular opening 58 and said opening has fixedly secured therein an annular housing member 60 which partially depends from said bottom wall. An elastic, tubular diaphragm 62 is secured at its inner annular edge 64 and at its outer annular edge 66 (see FIG. 4) to the housing member 60 and cooperates therewith to provide an annular pneumatic chamber 68. A rigid, bell-shaped valve member 70 is frictionally retained by diaphragm 62 and is further connected thereto with an elastic ring or band 72. Tension spring means 74 is connected between sheet member 54 and the valve member 70 to normally urge said valve member upwardly into the duct 52 as shown in FIG. 3.

A perforated or otherwise foraminous metal sleeve 76 is fixedly mounted on the housing member 60 and circumscribes the upper portion of the diaphragm 62. The sleeve 76 provides an air-permeable barrier in the duct 52 so that the same functions as a filter of air drawn through the duct. A depending side wall of the housing member 60 is also formed with a bleed hole 78 (see FIG. 4) whose function will become apparent as the description proceeds.

Figure 2:
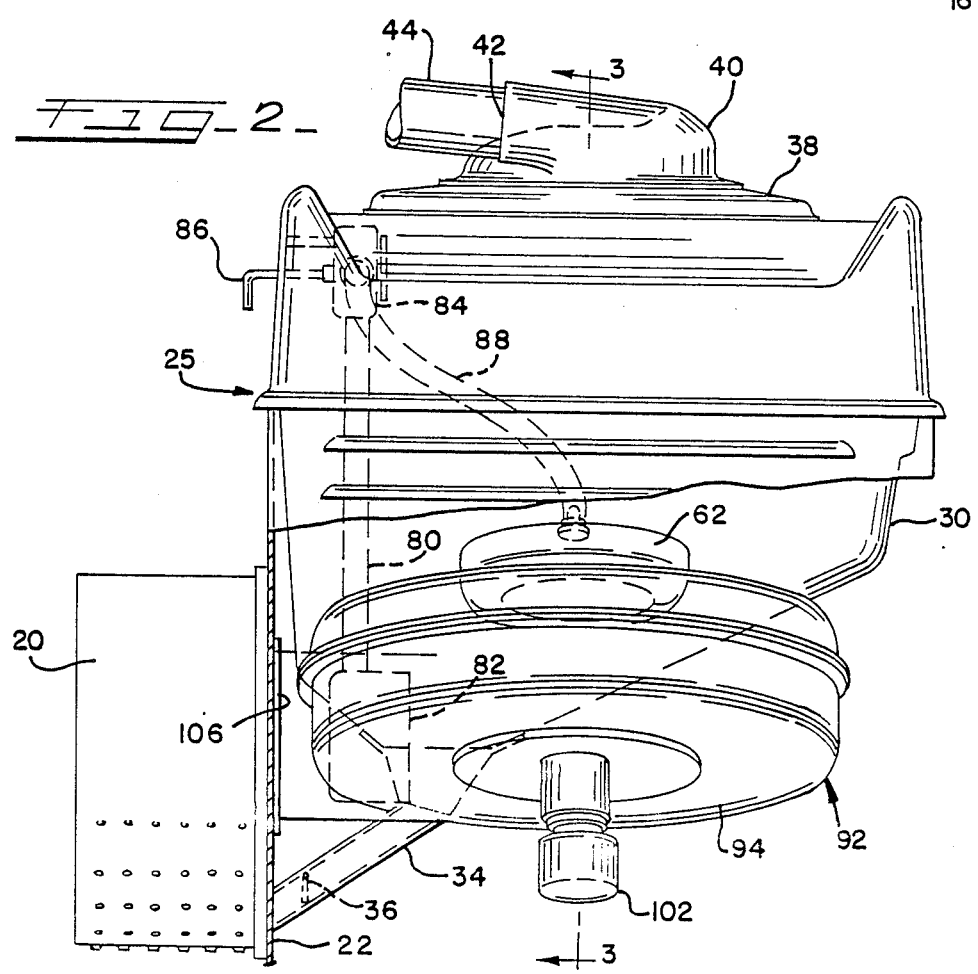
FIG. 2 is an enlarged fragmentary side elevational view, partially cutaway, of the hopper and seed drum of the planter shown in FIG. 1.

A pressure supply tube 80 is mounted on and projects through the hopper bottom wall 26. The lower end of the tube 80 depends from the bottom wall 26 and comprises an air inlet 82. Pressure supply tube 80 projects substantially vertically within the hopper 25 to a point adjacent the top of the hopper, and the upper edge of the tube carries a two-position air direction valve 84 manually controllable by a handle 86 projecting from the hopper (FIG. 2).

An air hose 88 is connected between the valve 84 and the housing member 60. In one position of the valve 84, air entering the tube 80 through the inlet 82 is directed into the interior of the hopper 25 (FIG. 3), whereas rotation of the valve to the second position causes such air to be directed through the air hose 88 and into the flexible annular pneumatic chamber 68 provided by flexible diaphragm 62 and annular housing member 60 (FIG. 4).

The necessary source of pressurized air for planting operations comprises a centrifugal blower 92 mounted at bottom wall 26 and having a shroud or scroll 94 which is closed at the bottom, but has an upper annular central intake opening 96, and a positive pressure side outlet 98. The blower comprises fan blades 100 and a drive motor 102 which typically may be operatively connected to the tractor or other vehicle to which the implement 10 is connected. Air to the blower intake is drawn through louver means 104 for communication of the blower with the ambient atmosphere, with the air drawn through an optional oil cooler means 105 associated with said louvers.

The blower outlet 98 comprises a circumferential mounting flange 106 by means of which the blower is connected to the plate 22 (FIG. 2) so that the blower is in communication with the interior of the seed drum 20 through an opening formed in said plate. When the blower assembly is operationally mounted as illustrated, the blower lies in substantial parallelism with the bottom wall 26, and the air inlet 82 of the pressure supply tube 80 is positioned in the outlet 98 of the blower. It will thus be appreciated that operation of the blower 92 creates a positive pressure in the outlet 98 and a negative pressure at the top opening 96.

Operation of the invention can now be described and fully appreciated. At the beginning of a planting cycle, the hopper 25 will be filled with seeds to a level up to, but not blocking, the valve 84. With the relationship of parts shown in FIG. 3, operation of the blower 92 provides the necessary positive pressure in the drum 20 and the flapper 36 is pivoted to the open position to permit the gravity feeding of seeds into the drum. Simultaneously, positive air pressure passes through the tube 80 and through valve 84 into the hopper so that the desired equalization of pressure between the hopper and drum is achieved. In this condition, it will be noted that the diaphragm 62 and valve member 70 are spaced from the negative pressure opening 96 so that operation of the blower has no effect thereon. Also, the conical valve member 46 is in the upper, cap-sealing position under the influence of spring 50 as well as the positive pressure within the hopper.

When it is desired to refill the hopper, the handle 86 is operated to turn the valve 84 to the second position wherein the tube 80 is in communication with the annular housing member 60. Operation of the blower 92 now creates pneumatic pressure in the flexible chamber 68 via the tube 80 and air hose 88. The said pressure causes the diaphragm 62 to roll downwardly and carry with it the bell-shaped valve member 70 until the valve member seats in the blower intake opening 96 as shown in FIG. 4. In effect, the diaphragm acts to provide a rolling force to move the valve member 70 into engagement with the opening 96 which thereupon functions as a valve seat. As will be appreciated, the manner in which the diaphragm is connected to annular housing 60 at inner and outer connections 64 and 66 provides, together with the rigid bell-shaped valve member 70, differential surface areas at the upper and lower portions of the diaphragm. In this way, pressurization of the annular chamber 68 urges the diaphragm and the valve member 70 downwardly.

In this condition, the negative pressure at the blower center acts through the filter sleeve 76 and duct 52 to create a negative pressure within the hopper, and thereby draw down the conical valve member 46. Air flow into the hopper via inlet port 42 permits seeds to be drawn into the hopper from a bulk source through the tube 44, it being noted that the member 46 now also functions to slow down the incoming seeds to limit cracking and to radially disperse the seeds for even filling of the hopper. During the described refilling operation, the flapper valve 36 in the seed tube 34 has been urged back to the closed position (see FIG. 2) to prevent communication between the hopper, and seed drum into which positive air pressure continues to flow via blower outlet 98. Continued flow of pressurized air into the seed drum desirably avoids over-pressurization of annular chamber 68, thereby preventing damage to the diaphragm 62.

When the hopper has been refilled to the desired level, the valve 84 may be returned to the original position for the resumption of planting. It will here be noted that the bleed hole 78 permits de-pressurization of the chamber 68 whereupon the valve member 70 and diaphragm 62 return to the original position under the urging of the spring 74.

It will be readily appreciated from the foregoing detailed description of the invention and illustrative embodiment thereof that numerous variations and modifications may be effected without departing from the true spirit and scope of the novel concept of the principles of the invention.

What is claimed is:

1. In combination with a rotary drum seed planter, a seed hopper construction comprising:
    a hopper container having a plurality of external walls;
    blower means associated with said hopper container and having a positive pressure outlet communicating with said drum and a negative pressure opening;
    internal duct means interconnecting the interior of said hopper container with the negative pressure opening of said blower means;
    pneumatically operated valve means for controlling flow through said internal duct means;
    tube means in said hopper container having an air inlet communicating with said positive pressure outlet of said blower means and a first outlet leading into said hopper and a second outlet connected to said internal duct means; and
    valve means on said tube means operable in (1) a first position whereby positive air pressure from said blower means is directed into said hopper container to equalize the internal pressure of said container and said drum, and (2) in a second position to direct positive air pressure from said blower means to said pneumatic valve means to operate said pneumatic valve means to connect said internal duct means with said negative pressure opening of said blower means and thereby creating through said duct means a negative pressure in said container for drawing in seeds from an outside source to refill said container.

2. A seed hopper construction according to claim 1, wherein
    said pneumatic valve means comprises a tubular diaphragm and a housing member mounted from said internal duct means, the opposite ends of said diaphragm being secured to said housing member and providing an annular pneumatic chamber which is pressurized attendant to disposition of said air direction valve in said second position.

3. A seed hopper construction according to claim 2, wherein:
    said pneumatic valve means further comprises a rigid bell-shaped valve member retained generally within said tubular diaphragm, and means normally urging said valve member into spaced relation relative to said negative pressure opening of said blower means.

4. A seed hopper according to claim 3, wherein said urging means comprises a spring connected between a wall of said internal duct means and said bell-shaped valve member.

5. A seed hopper according to claim 3, comprising:
    an air hose which is part of said tube means that connects said annular chamber to said air direction valve, whereby operation of said air direction valve in the second position pressurizes said annular chamber to roll said diaphragm away from said internal duct means for carrying said valve member therewith into seating engagement with said blower means negative pressure opening.

6. A seed hopper according to claim 4, wherein said housing member comprises pneumatic bleed means whereby said chamber is de-pressurized under the urging of said spring when said air direction valve is operated from said second position back to said first position.

7. A seed hopper according to claim 1, wherein said internal duct means is in part defined by one of said external walls of said hopper container, said one wall comprising a tapering bottom wall of said container, and said blower means comprising a centrifugal blower operationally mounted to said container in substantially parallelism with said tapering bottom wall, said centrifugal blower comprising a scroll having a central annular opening which defines said negative pressure opening and provides a valve seat engageable by said pneumatic valve means.

8. A seed hopper according to claim 7, comprising:
a seed tube connected between a bottom portion of said hopper container and said rotary drum for gravity feeding seeds into said drum, and means in said seed tube for closing communication between the drum and the container.

9. A seed hopper according to claim 1, comprising:
a cap member in a top wall of said container having an inlet opening connectable to an outside seed source, and valve means for sealing engagement with said cap member inlet opening under the influence of positive air pressure within said container.

10. A seed hopper according to claim 9, wherein said last mentioned valve means comprises a conical valve member and spring means normally urging said conical valve member into sealing engagement with said cap member inlet opening, said conical valve member being withdrawn from sealing engagement responsive to the condition of negative pressure in said container, and being adapted to radially disperse and slow the speed of incoming seeds.

11. A seed hopper construction for a rotary drum seed planter, comprising:
a hopper container having side walls and a plurality of downwardly tapering bottom walls;
a mounting plate secured to a side wall of said container;
a rotary seed drum operationally mounted on said mounting plate;
a seed tube connecting the bottom of said container with the interior of said drum through an opening in said mounting plate;
an internal duct in said container adjacent one of said tapering bottom walls, said one bottom wall having an annular opening therein communicating with said duct;
pneumatic valve means positioned generally in said duct and projecting through said annular opening in said one bottom wall for controlling the flow of air through said duct;
a substantially vertical pressure supply tube mounted in said container having a bottom air inlet depending from said one bottom wall;
a centrifugal blower mounted to said container in substantial parallelism with said one bottom wall, said blower comprising a scroll having a positive pressure side outlet communicating with said air inlet of said supply tube and the interior of said drum through another opening in said mounting plate, and a central negative pressure opening in spaced apart registry with said internal duct; and
a two-position air direction valve mounted on said pressure supply tube for directing air into the container when in a first position and directing air through a connector hose to said pneumatic valve means when in a second position,
whereby operation of said air direction valve in the first position creates a condition of equalized positive pressure in said container and drum, and operation of the air direction valve in the second position interconnects the duct with the negative pressure opening of said blower by operating said pneumatic valve means to create a negative pressure through said duct in said container for drawing in seeds from an outside source to refill said container.

12. A seed hopper according to claim 11, wherein said pneumatic valve means comprises an annular rigid housing mounted in the annular opening in said one bottom wall and having portions depending therefrom, and a flexible tubular diaphragm having its upper edge secured to an inner edge of said housing and its lower edge secured to a depending outer edge of said housing to provide a deformable chamber, said connector hose communicating with the interior of said chamber, a rigid bell-shaped open-ended valve member retained generally within said diaphragm, and spring means normally urging said valve member up into said duct, whereby pressurization of said chamber causes said diaphragm to roll downwardly and move said valve member into seating engagement with the negative pressure opening of said blower.

13. A seed hopper according to claim 12, wherein said annular housing defines a bleed hole in a depending wall, whereby said chamber is de-pressurized and returns said valve member to its position in the duct when said air direction valve is returned back to the first position from the second position.

14. A seed hopper according to claim 11, comprising:
means in said seed tube sealing communication between said drum and container when a condition of negative pressure is created in the container.

15. A seed hopper according to claim 11, comprising:
a cap in a top wall of said container having an inlet opening connectable to an outside seed source, a conical valve member mounted from said cap, and spring means normally urging said conical valve member into sealing engagement with said inlet opening, said conical valve member being withdrawn from sealing engagement responsive to the condition of negative pressure in the container and providing a radial dispersing and speed-slowing baffle for incoming seeds.

* * * * *